Oct. 27, 1964    J. M. BOND    3,153,819
COMBINED BLIND AND WINDOW UNIT
Filed March 16, 1961    2 Sheets-Sheet 1

INVENTOR.
JOSEPH M. BOND
BY
John F. A. Earley, Jr.
ATTORNEY

Oct. 27, 1964  J. M. BOND  3,153,819
COMBINED BLIND AND WINDOW UNIT
Filed March 16, 1961  2 Sheets-Sheet 2

INVENTOR.
JOSEPH M. BOND
BY *John F. A. Earley Jr.*
ATTORNEY

United States Patent Office 3,153,819
Patented Oct. 27, 1964

3,153,819
COMBINED BLIND AND WINDOW UNIT
Joseph M. Bond, Jenkintown, Pa., assignor to Polarpane Corporation, Pennsauken, N.J., a corporation of New Jersey
Filed Mar. 16, 1961, Ser. No. 96,204
7 Claims. (Cl. 20—56.5)

This invention relates to improvements in window structure, and more particularly concerns a combined blind and insulating window unit which controls the admission of solar heat and light and requires little or no maintenance.

The need for window structure having good inexpensive sun control has long been recognized and various proposals have been made for supplying that need.

For example, it has been proposed to provide tinted, heat-absorbing glass in window structures. However, tinted glass is expensive and is not too effective. While tinted glass excludes a portion of the solar heat and light in the summertime when it is not wanted, it also excludes solar heat and light in the wintertime when it is desired. Moreover, tinted glass is not considered as attractive-looking as plain glass by many people.

Another proposal has been to supply louvers mounted outside the windows of the building. Some of these louvers are stationary, and some of them are provided with a mechanism for rotating the slats so as to control their angular position.

Outside louvers are more effective than tinted glass, but they are even more expensive, both in initial cost and installation, and in maintenance thereof. Also, many architects refuse to use outside louvers for aesthetic reasons because they are considered unattractive in appearance.

The conventional Venetian blind which is mounted at a window inside the wall of a room does not solve the problem because it traps heat inside the room. Solar energy is invisible and causes heat only when it strikes an object. Accordingly, when solar energy strikes the outside of conventional Venetian blind slats, it heats the slats, and the space between the slats and the inside of the windowpane, and this heat circulates through the room.

It has also been proposed to provide Venetian blinds which are mounted inside the space between the two panes of glass in an insulating window unit. However, such arrangements have required the use of mechanical controls such as a crank or lever which has a shaft that penetrates through an opening into the space between the glass panes. The sealing of this opening presents a very difficult problem.

Such window units in order to be effective must be hermetically sealed so as to provide a dead air space which serves as insulation. The hermetical seal is also necessary to prevent the transfer of dust, dirt, or moisture into the space between the panes, in order to keep the elements of the blind from becoming dusty or dirty, and to prevent film from collecting on the inside surfaces of the glass panes.

Accordingly, it is an object of this invention to provide a combined blind and window unit which overcomes the aforementioned problems and disadvantages.

It is another object to provide a window unit which controls the admission of solar heat and light, and which provides insulation.

It is another object of this invention to provide a window unit which is attractive in appearance, and which is inexpensive to install and maintain.

It is another object of this invention to provide a combined blind and window unit in which the blind is not subject to deterioration or corrosion, or to dust and dirt, and which never needs cleaning.

It is another object to provide a combined blind and window unit which utilizes inexpensive materials of light weight and which is easily operated.

Other objects and advantages of this invention, including its simplicity and economy, will further become apparent hereinafter and in the drawings, in which.

Figure 1:
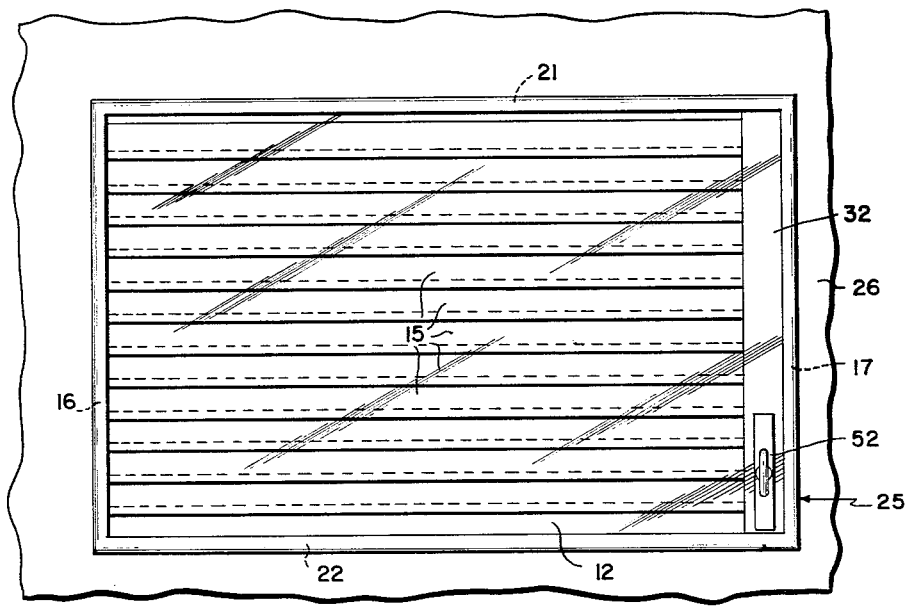
FIG. 1 is a view in front elevation of a combined blind and window unit constructed in accordance with this invention.
Figure 2:
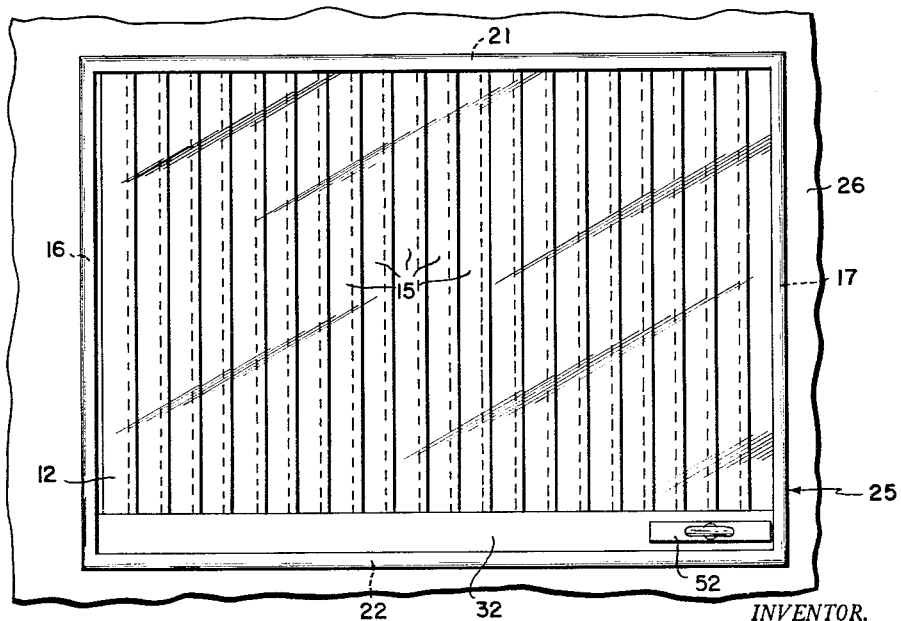
FIG. 2 is a view in front elevation of a modified form of the invention having vertical slats instead of the horizontal slats of FIG. 1.
Figure 3:
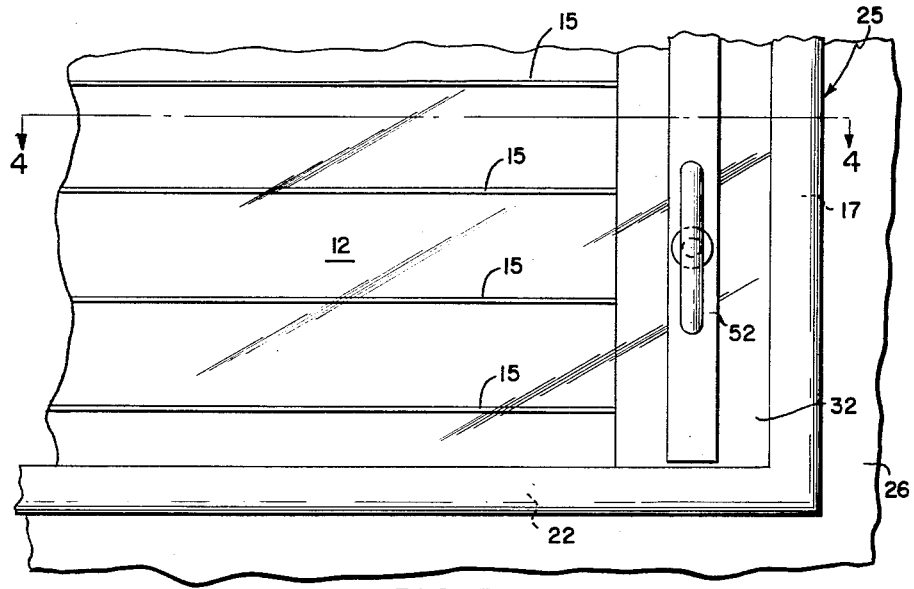
FIG. 3 is a partial view on an enlarged scale of the window unit of FIG. 1.
Figure 4:
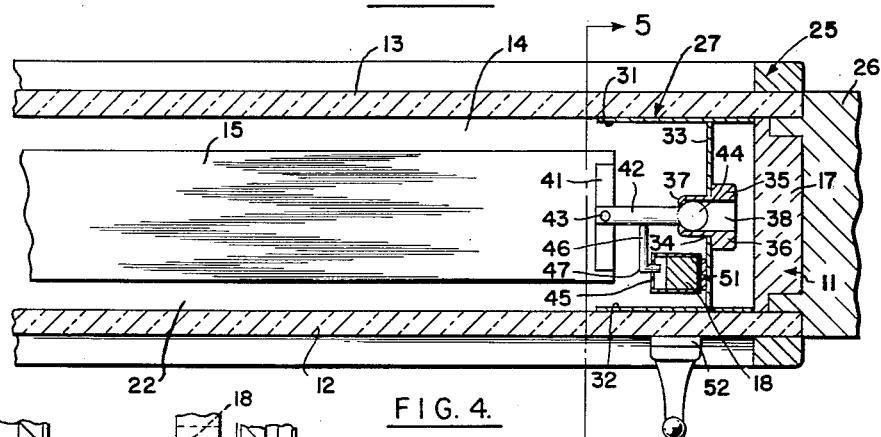
FIG. 4 is a view in section taken as indicated by the lines and arrows 4—4 which appear in FIG. 3.
Figure 5:
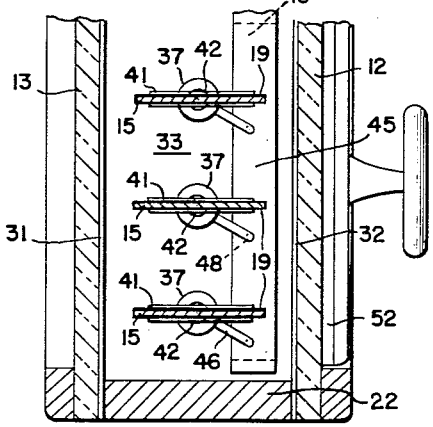
FIG. 5 is a view in section taken as indicated by the lines and arrows 5—5 which appear in FIG. 4.

Although specific terms are used in the following description for clarity, these terms are intended to refer only to the structure shown in the drawings and are not intended to define or limit the scope of the invention.

Turning now to the specific embodiments of the invention selected for illustration in the drawings, there is shown a combined blind and insulating window unit which broadly includes a divider frame 11, an inside glass pane 12 and an outside glass pane 13 mounted on frame 11 to define a dead air space 14 therebetween, a series of rotatable slats 15 mounted between a pair of opposed frame members such as side frame members 16, 17, and magnetic means including inside operating magnet 18 positioned within space 14 and operatively connected to slats 15, and operable from the exterior of the window unit to position slats 15 at any desired angle in order to admit, or preclude the admission of, solar heat and energy. Slats 15 may be provided with a coating 19 of vinyl plastic.

Divider frame 11 includes a top frame member 21 and bottom frame member 22 joined together by horizontally spaced-apart side members 16, 17. Divider frame 11 is mounted in a window frame 25 which is seated in wall 26 of a building.

A vertical H-member 27 is positioned adjacent each side member 16, 17 and includes posts 31, 32 which are positioned adjacent panes 13, 12, respectively. A cross bar 33 extends between posts 31, 32 and has a series of openings 34 formed therein in which are mounted a series of bearing sleeves 35.

Sleeves 35 have at one end a shoulder member 36 of larger diameter than openings 34, and have at the other end a retaining lip 37 which is of smaller diameter than bore 38 of sleeves 35.

The series of rotatable slats 15 may be made of fabric coated with a vinyl plastic and are mounted between pairs of bearing sleeves 35. Tape bars 41 are fastened to the ends of slats 15 which are stretched tightly therebetween, and bars 41 may be made of vinyl plastic so as to make a good connection with the vinyl plastic covering of slats 15.

A bearing pin 42 is connected to tape bar 41 by a screw 43. Pin 42 has an enlarged head 44 positioned in bore 38 of sleeve 35 and retained therein by retaining lip 37. In assembly, the shank of bearing pin 42 is inserted through bore 38 from the shoulder member 36 end of sleeve 35, and the pin 42 is then attached to tape bar 41 by screw 43, or by other means such as by stapling or riveting.

An operating member, such as operating tube 45, is positioned in dead air space 14 and serves to move operating rods 46 which extend from bearing pins 42. Magnet 18 is adhesively mounted in the lower portion of tube 45.

Operating rods 46 are L-shaped with a prong 47 extending into holes in operating tube 45. The prongs 47 above magnet 18 extend into tube 45 a sufficient distance to block upward passage of magnet 18 should it ever become detached from its mounting.

A retaining magnet 51 is fixedly mounted on the cross bar 33 and is adapted to coact with magnet 18 to hold it steady in a desired position.

An outside operating magnet 52 is movably positioned outside the window unit and is adapted to coact with inside operating magnet 18 to overcome the force of retaining magnet 51 to move inside operating magnet 18.

In operation, the moving of magnet 52 moves magnet 18 and operating tube 45 to thereby change the angular position of slats 15. It is to be noted that the window unit is hermetically sealed, and the slats are positioned from outside the unit without breaking that hermetical seal.

H-member 27 may be made of vinyl plastic which provides a very good thermal barrier and which avoids condensation.

Slats 15 may be of such dimensions that any deflection thereof does not impede the changing of their angular position. For example, slats 15 may be made one inch wide and panes 12, 13 may be positioned one and one-half inches apart. Of course, any deflection of slats 15 made of a tape covered with vinyl plastic, would never impede the changing of slat angular position, since the slat is of such material that it would bend on contact with the glass pane.

The edges of slats 15 overlap to insure complete closure when the blind is closed.

The edges of slats 15 may bend to permit complete rotation of the slats. It is to be noted that tape bars 41 are not as wide as slats 15. The shorter width of bars 41 prevents them from contacting each other so that they do not impede complete closing of the slats 15, which form a continuous membrane when closed.

Outside operating magnet 52 may be kept in a desk drawer, for example, and only one outside magnet 52 is needed for a bank windows.

Bearing sleeves 35 may be made of nylon to lessen friction and insure good and lasting wear. While slats 15 may be vinyl or rayon-coated fabric, they may also be made of aluminum or other material as desired.

The ends of slats 15 which are positioned adjacent side member 16 are attached to tape bars 41 which are connected to bearing sleeves 35 by bearing pins 42. No operating rod 46 is necessary at this end of the slats 15.

When operating tube 45 is moved to rotate slats 15, the slats tend to twist because of the friction on the ends of slats 15 near side member 16 caused by bearing sleeves 35 and bearing pins 42. Accordingly, slats 15 may be made of a substantially rigid material, such as a rigid fabric or a metal, so as not to twist. Aluminum of .010 inch thickness, stretched between tape bars 41 for strength, and covered with vinyl plastic to reflect as much solar heat as possible, may be used. While aluminum itself transfers heat and cold readily, the vinyl plastic coating gives greater insulation value to slats 15 because of the lower thermal conductivity of the plastic. If aluminum slats are used, they may be ribbed for greater strength.

The posts 31, 32 serve to exclude the solar heat and light around the operating mechanism and are preferably made of vinyl plastic to eliminate sweating.

Retaining magnet 51, besides holding inside operating magnet 18 in position when slats 15 are stationary, also gives the operation a smooth, rather than jerky, motion when the angular position of slats 15 is being changed.

Magnets 18, 51 and 52 are preferably permanent ceramic magnets.

The advantages of the present invention are numerous. It provides a window unit which controls the admission of solar heat and energy as desired, and does so without breaking the hermetical seal of the unit. Further, it increases the insulation values of the window unit because it provides two dead air spaces instead of the usual one. (When the slats are closed, there is one dead air space between the outside pane and the slats, and another dead air space between the slats and the inside pane.)

Another advantage is that the blind is maintenance-free, inasmuch as it is mounted in a dead air space, and does not corrode or deteriorate. The use of this invention at the seashore is especially advantageous, because it is unaffected by corrosion caused by the salt air.

A further advantage is that the elements of the blind do not get dirty. Dust and dirt do not penetrate the hermetical seal, and the blind never has to be cleaned. This is a distinct benefit to housewives, and a boon to anyone who has ever had to clean Venetian blinds.

The window unit of the present invention is of comparatively low cost. Outside louvers require large heavy blind slats because they have to withstand wind loads, and such slats are expensive. The slats of the present invention do not have to withstand wind forces and accordingly may be made of light, less expensive material.

It is to be understood that the form of the invention herewith shown and described is to be taken as a preferred embodiment. Various changes may be made in the shape, size and arrangement of parts. For example, equivalent elements may be substituted for those illustrated and described, parts may be reversed, and certain features of the invention may be utilized independently of the use of other features, all without departing from the spirit or scope of the invention as defined in the subjoined claims.

The claimed invention:

1. A combined blind and window unit comprising a divider frame having top and bottom frame members joined together by horizontally spaced-apart side members, an inside and outside glass pane mounted on the frame to define a space therebetween, a series of rotatable slats mounted between a pair of opposed frame members, inside operating means positioned in said space for turning the slats in unison to any desired angle, and outside operating means positioned outside said space and magnetically connected to said inside operating means for magnetically actuating said inside operating means to move the slats in unison to any desired angle and for holding the inside operating means at any desired position to hold said slats at said desired angle.

2. A combined blind and window unit comprising a divider frame having top and bottom frame members joined together by horizontally spaced-apart side members, an inside and outside glass pane mounted on the frame to define a dead air space therebetween, a series of rotatable slats mounted between a pair of opposed frame members, an operating member positioned in said dead air space and connecting said slats together and adapted to rotate said slats, a first permanent magnet movably positioned in said dead air space and connected to said operating member, and a retaining magnet fixedly positioned within said dead air space to coact with said first magnet to hold it and said operating member and said slats in a desired position, said unit being hermetically sealed, and operating means magnetically connected to said operating member.

3. A combined blind and window unit comprising a divider frame having top and bottom frame members joined together by horizontally spaced-apart side members, an inside and outside glass pane mounted on the frame to define a dead air space therebetween, a series of rotatable slats mounted between a pair of opposed frame members, an operating member positioned in said dead air space and operatively connected to and adapted to rotate said slats, a first permanent magnet movably positioned in said dead air space and connected to said operating member, a retaining magnet fixedly positioned within said air space to coact with said first magnet to hold it in a desired position, said operating member, first magnet, and retaining magnet being positioned within a side member of said frame so as to be concealed from view, and a second permanent magnet movably positioned outside said unit and adapted to coact with the first magnet to overcome the force of said retaining magnet and move the first magnet and the operating member and thereby position the slats at a desired angle, said unit being hermetically sealed.

4. A combined blind and insulating window unit comprising an insulating divider frame having top and bottom frame members joined together by horizontally spaced-apart side members, an inside and outside glass pane mounted on the frame to define a dead air space therebetween, a vertical H-member positioned adjacent each side member and having a post adjacent each pane with a cross bar extending therebetween, said cross bars having a series of openings formed therein, a series of bearing sleeves mounted in said cross bar openings, said sleeves having a shoulder member at one end of larger diameter than said openings and a retaining lip at the other end of smaller diameter than the bore of said sleeves, a series of rotatable slats mounted between said bearing sleeves, a bearing pin connecting one end of each slat to one of said sleeves and having an enlarged head positioned in the bore of said sleeve and retained therein by the retaining lip, an operating member positioned in said air space, an operating rod connected between said bearing pin and said operating member, inside magnetic means movably positioned in said space and magnetically operable from the exterior of said unit to position the slats at a desired angle, and inside magnetic means fixedly positioned in said space to hold said other magnetic means in a desired position.

5. A combined blind and insulating window unit comprising an insulating divider frame having top and bottom frame members joined together by horizontally spaced-apart side members, an inside and outside glass pane mounted on the frame to define a dead air space therebetween, a vertical H-member positioned adjacent each side member and having a post adjacent each pane with a cross bar extending therebetween, said cross bars having a series of openings formed therein, a series of bearing sleeves mounted in said cross bar openings, said sleeves having a shoulder member at one end of larger diameter than said openings and a retaining lip at the other end of smaller diameter than the bore of said sleeves, a series of rotatable slats mounted between said bearing sleeves, a tape bar fastened to the end of each slat, a bearing pin connected to each tape bar and extending to one of said sleeves and having an enlarged head positioned in the bore of said sleeve and retained therein by the retaining lip, an operating member positioned in said air space, an operating rod connected between said bearing pin and said operating member, inside magnetic means movably positioned in said space and operatively connected to said slats and operable from the exterior of said unit to position the slats at a desired angle, and inside magnetic means fixedly positioned in said space to hold said other magnetic means in a desired position.

6. A combined blind and insulating window unit comprising an insulating divider frame having top and bottom frame members joined together by horizontally spaced-apart side members, an inside and outside glass pane mounted on the frame to define a dead air space therebetween, a vertical H-member positioned adjacent each side member and having a post adjacent each pane with a cross bar extending therebetween, said cross bars having a series of openings formed therein, a series of bearing sleeves made of nylon and mounted in said cross bar openings, said sleeves having a shoulder member at one end of larger diameter than said openings and a retaining lip at the other end of smaller diameter than the bore of said sleeves, a series of rotatable slats coated with vinyl plastic and mounted between said bearing sleeves, a vinyl plastic tape bar fastened to the end of each slat, a bearing pin connected to each tape bar and extending to one of said sleeves and having an enlarged head positioned in the bore of said sleeve and retained therein by the retaining lip, an operating tube positioned in said dead air space, an operating rod connected between said bearing pin and said operating tube, a first permanent magnet connected to said operating tube, a retaining magnet fixedly mounted on said cross bar and adapted to coact with said first magnet to hold it in a desired position, said bearing sleeves, operating tube, operating rods, first magnet, and retaining magnet being positioned within said H-members so as to be concealed from view, and a second permanent magnet movably positioned outside said unit and adapted to coact with the first magnet to overcome the force of said retaining magnet and move the first magnet and the operating tube to thereby position the slats at a desired angle, said unit being hermetically sealed.

7. A combined blind and window unit comprising a divider frame having top and bottom frame members joined together by horizontally spaced-apart side members, an inside and outside glass pane mounted on the frame to define a space therebetween, a series of rotatable slats mounted between a pair of opposed frame members, inside magnetic means movably positioned in said space and connecting said slats together and magnetically operable from the exterior of said unit to poistion the slats at any desired angle, inside magnetic means fixedly positioned in said space to hold said other inside magnetic means in a desired position, and outside magnetic means positioned outside said unit for moving said movable inside magnetic means.

References Cited in the file of this patent

UNITED STATES PATENTS

| | | |
|---|---|---|
| 2,235,680 | Haven et al. | Mar. 18, 1941 |
| 2,281,064 | Englehart | Apr. 28, 1942 |
| 2,343,813 | Simon | Mar. 7, 1944 |
| 2,854,102 | Peeples | Sept. 30, 1958 |
| 2,894,573 | Rosenfeld | July 14, 1959 |
| 3,022,549 | Cummings | Feb. 27, 1962 |